(12) United States Patent
Mak et al.

(10) Patent No.: US 7,917,880 B2
(45) Date of Patent: Mar. 29, 2011

(54) METHOD FOR REDUCING POWER CONSUMPTION OF INTEGRATED CIRCUIT

(75) Inventors: Wai Kei Mak, Hsinchu (TW); Wei Chung Chao, Taichung County (TW)

(73) Assignee: National Tsing Hua University, Hsinchu (TW)

( * ) Notice: Subject to any disclaimer, the term of this patent is extended or adjusted under 35 U.S.C. 154(b) by 426 days.

(21) Appl. No.: 12/042,978

(22) Filed: Mar. 5, 2008

(65) Prior Publication Data

US 2009/0228844 A1    Sep. 10, 2009

(51) Int. Cl.
*G06F 17/50* (2006.01)
*G06F 9/455* (2006.01)

(52) U.S. Cl. ......... 716/133; 716/110; 716/114; 716/104
(58) Field of Classification Search .................. 716/2, 6, 716/9–10, 104, 110, 114, 133
See application file for complete search history.

(56) References Cited

U.S. PATENT DOCUMENTS

| | | | |
|---|---|---|---|
| 6,230,300 B1 * | 5/2001 | Takano | 716/2 |
| 6,321,185 B1 * | 11/2001 | Takahashi | 703/15 |
| 6,536,024 B1 * | 3/2003 | Hathaway | 716/6 |
| 6,718,523 B2 * | 4/2004 | Hathaway et al. | 716/4 |
| 7,725,848 B2 * | 5/2010 | Nebel et al. | 716/4 |
| 2002/0069396 A1 * | 6/2002 | Bhattacharya et al. | 716/7 |
| 2003/0009733 A1 * | 1/2003 | Hathaway et al. | 716/6 |
| 2005/0204316 A1 * | 9/2005 | Nebel et al. | 716/2 |

OTHER PUBLICATIONS

Amir H Farrahi et al.,; Activity-Driven Clock Design; Journal; Jun. 2001; pp. 705-714; vol. 20, No. 6; IEEE transactions on computer-aided design of integrated circuits and systems.
David Garrett et al.,; Challenges in Clockgating for a Low Power ASIC Methodology; Journal; 1999; pp. 176-181; ACM.
Takeshi Kitahara et al.,; A Clock-Gating Method for Low-Power LSI Design; Journal; 1998; pp. 307-312; IEEE.
Jaewon Oh et al.,; Gated Clock Routing for Low-Power Microprocessor Design; Journal; Jun. 2001; pp. 715-722; vol. 20, No. 6; IEEE transactions on computer-aided design of integrated circuits and systems.
Ting-Hai Chao et al.,; Zero Skew Clock Routing with Minimum Wirelength; Journal; Nov. 1992; pp. 799-814; vol. 39, No. 11; IEEE Transactions on circuits and system-ii: analog and digital signal processing.

* cited by examiner

*Primary Examiner* — Stacy A Whitmore
(74) *Attorney, Agent, or Firm* — WPAT, P.C.; Anthony King

(57) ABSTRACT

A method for reducing power consumption for an integrated circuit comprises the steps of (1) providing (i) a clock tree wherein the clock tree comprises a clock source, a plurality of clock sinks, and a plurality of internal nodes, (ii) the physical locations of the clock source, the clock sinks, and physical location of a gating-signal control logic circuit, (iii) the activity information of the sinks; (2) recursively determining a merging segment set containing merging segments for each internal node and computing switched capacitance of a subtree rooted at each internal node in a bottom up manner, wherein the merging segments have the same signal delay for the clock sinks in a subtree rooted at each internal node; and (3) recursively determining a location for each internal node selected from the merging segment set in a top down manner on a basis that the switched capacitance of a subtree rooted at each internal node is minimum.

12 Claims, 6 Drawing Sheets

| Procedure Build-Tree-of-Merging-Segment-Sets |
|---|
| Input: Topology G. Sink locations and capacitances, Location of GCL. Activity patterns of sinks.<br>Output: Tree of merging segment sets containing a set $MSS(v)$ for each node $v$ of $G$. Edge length $|e_{v,k}|$, and type and location of gate (AND gate/buffer) inserted, if any, on $e_{v,k}$ corresponding to each $ms_{v,k} \in MSS(v)$ for each $v \neq s_0$ |

```
for each node v of G in bottom-up order
  if v is a sink node
    MSS(v) ← {pl(v)}
  else
    Let l and r be the children of v;
    MSS(v) ← φ;
    k = 1;
    for each ms_{l,i} ∈ MSS(l)
      for each ms_{r,j} ∈ MSS(r)
        for each buffering/gating combination
          Calculate - Edge - Lengths(|e_{l,i}|,|e_{r,j}|);
          Create TRRs trr_{l,i} and trr_{r,j} as follows:
              core(trr_{l,i}) ← ms_{l,i}
              radius(trr_{l,i}) ← |e_{l,i}|
              core(trr_{r,j}) ← ms_{r,j}
              radius(trr_{r,j}) ← |e_{r,j}|;
          ms_{v,k} ← trr_{l,i} ∩ trr_{r,j};
          Calculate - SC(ms_{v,k}) by (EQ 8);
          MSS(v) ← MSS(v) ∪ {ms_{v,k}};
          k = k+1
        endfor
      endfor
    endfor
    Solution - Sampling(MSS(v))
  endif
```

FIG. 6

Procedure Find - Exact - Placements

Input: Tree of merging segment sets containing $MSS(v)$ for each node $v$ of $G$. $|e_{v,k}|$, type and location of gate (AND gate/buffer) inserted, if any, on $e_{v,k}$ corresponding to each $ms_{v,k} \in MSS(v)$ for each $v \neq s_0$.
Output: Zero - skew gated clock tree $T$ with exact placement location $pl(v)$ for each node $v$.

for each internal node $v$ of $G$ in top - down order
  if $v$ is the root
    Find $ms_{v,k} \in MSS(v)$ s.t. $SC$ is the least;
    Let $q \in ms_{v,k}$ be closest to the clock source $s_0$;
    $pl(v) \leftarrow q$
  else
    Let $p$ be the parent node of $v$ and $pl(p) \in ms_{p,i}$;
    Let $ms_{v,k} \in MSS(v)$ from which $ms_{p,i}$ was obtained;
    Construct $trr_p$ as follows:
      $core(trr_p) \leftarrow \{pl(p)\}$
      $radius(trr_p) \leftarrow |e_{v,k}|$
    Choose any $q \in ms_{v,k} \cap trr_p$;
    $pl(v) \leftarrow q$;
    Insert AND gate/buffer, if any, associated with $e_{v,k}$
endif

FIG. 7

METHOD FOR REDUCING POWER CONSUMPTION OF INTEGRATED CIRCUIT

BACKGROUND OF THE INVENTION (A) Field of the Invention

The present invention relates to a method for reducing power consumption of an integrated circuit, and more specifically, to a low power gated and buffered clock network construction.

(B) Description of the Related Art

Clock signals are employed in VLSI system designs to synchronize the actions of the components of a design. Minimizing the clock skew and the clock power are of vital importance. The clock skew affects the maximum attainable frequency of operation and must be carefully controlled to ensure the correct functioning of the system. In addition, the clock net is a major source of power consumption in a system since it switches most frequently and it is a huge net that spans the entire chip with a large number of fanouts. Thus reducing the power consumption of the clock net can have a significant impact on the overall system power consumption.

Today power issue becomes more and more important because of the booming market of power critical devices such as portable electronic appliances and mobile devices. Since 30-50% of chip power is dissipated in the clock networks, researchers pay much attention to develop power reduction techniques for the clock network.

Clock gating is an effective power reduction technique for sequential circuits. The main idea is to temporarily turn off idle sub-circuits to save energy due to unnecessary switching. However, applying clock gating at the logical level and ignoring the physical placement of clock sinks may introduce unnecessary wiring and the increased power consumption due to the wiring can outweigh the saving from gating. Therefore, a gated clock tree construction algorithm must take logical as well as physical information into account.

Some works on gated clock tree construction considering both logical and physical information have been proposed. Unfortunately, there are a few shortcomings in these works. Some researches construct an initial zero-skew gated-clock tree but do not guarantee the final skew is zero after the refinement procedures, or only try to balance the number of gates and buffers between the source to sink paths but do not take wire delay into account to control the skew.

Therefore, it is necessary to construct a comprehensive gated and buffered clock network in which both the interconnect delay and the gate delay are taken into account, so as to minimize the clock power consumption.

SUMMARY OF THE INVENTION

The present invention is directed to providing a method for reducing power consumption for an integrated circuit, by which a gated and buffered clock network is constructed to minimize the clock power consumption. The present invention may consider both masking logic insertion and buffer insertion simultaneously in the clock network construction process in order to get the best result.

In accordance with the present invention, a method for reducing power consumption for an integrated circuit is proposed. The method comprises the steps of (1) providing (i) a clock tree wherein the clock tree comprises a clock source, a plurality of clock sinks and a plurality of (internal) nodes, (ii) the physical locations of the clock source, the clock sinks, and the physical location of a gating-signal control logic circuit, (iii) the activity information of the sinks; (2) recursively determining a merging segment set containing merging segments for each node and computing switched capacitance of a subtree rooted at each node in a bottom up manner, wherein the merging segments have the same signal delay for the clock sinks in a subtree rooted at each node; and (3) recursively determining a location for each node selected from the merging segment set in a top down manner on a basis that the switched capacitance of a subtree rooted at each node is minimum.

In an embodiment, the switched capacitance of a subtree rooted at a node is the sum of switched capacitance of a first portion (e.g., left portion) of the subtree having a first child node of the node and switched capacitance of a second portion (e.g., right portion) of the substree having a second child node of the node.

If a masking gate is placed on an edge connecting the node and the first child node, the switched capacitance of the first portion of the subtree having a first child node of the node is a function related to capacitance of the gate, capacitance of the edge, and capacitance between the node and the gating-signal control logic circuit, a signal probability of the gating-signal control logic circuit to the first child node, and a transition probability of the gating-signal control logic circuit to the first child node. If a buffer is placed on an edge connecting the node and the first child node, the switched capacitance of the first portion of the subtree having a first child node of the node is the sum of capacitance of the buffer, capacitance of the edge, and switched capacitance of a subtree rooted at the first child node. The computation of the switched capacitance of the second portion is analogous to that of the switched capacitance of the first portion.

The present invention uses both the logical and the physical information of the modules, and considers both masking logic insertion and buffer insertion simultaneously in the clock network construction process. The present invention guarantees to yield a zero-skew clock tree where both the interconnect delay and the gate delay are taken into consideration. The control signal power consumption overhead is also accounted for so that the overall clock power consumption can be minimized.

BRIEF DESCRIPTION OF THE DRAWINGS

The objectives and advantages of the present invention will become apparent upon reading the following description and upon reference to the accompanying drawings in which:

FIGS. 6 and 7 illustrate algorithms for bottom up merging phase and top down embedding phase in accordance with an embodiment of the present invention.

DETAILED DESCRIPTION OF THE INVENTION

The present invention proposes an efficient algorithm to construct a low power zero-skew gated clock network given the module locations and activity information. Unlike previous works, masking logic insertion and buffer insertion are considered simultaneously so as to yield a zero-skew clock tree. Both the logical and physical information of the modules are carefully taken into consideration when determining where masking logic should be inserted. The power overhead of the control signals is also taken into account so that the total average power consumption of the constructed zero-skew gated clock network can be minimized.

Figure 1:
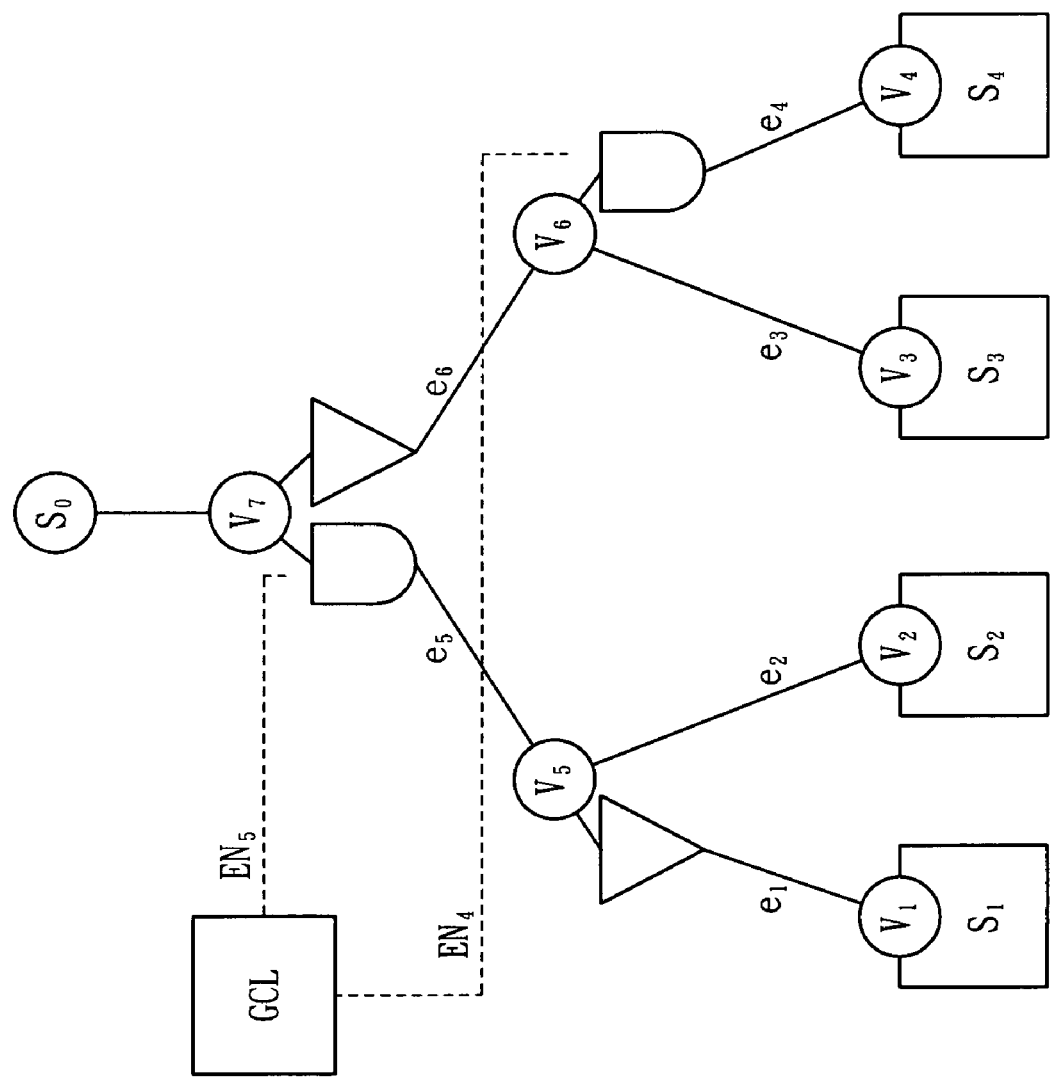
FIG. 1 illustrates a gated and buffered clock network in accordance with an embodiment of the present invention.

Given the locations and capacitances of a set of clock sinks $S=\{s_1, s_2, \ldots, s_n\}$, and a connection topology which is a rooted binary tree, G, with n leaves corresponding to the clock sinks. The clock sinks represent some sub-circuits or modules. Assuming that the topology of the clock routing is a full binary tree, that is, every non-leaf node has exactly two children. However, it needs not be a balanced tree. An example clock tree topology is shown in FIG. 1.

A clock tree T is an embedding of a topology G in the Manhattan plane, i.e., T assigns each internal node v∈ G to a placement location pl(v). The clock tree is rooted at a clock source, $S_0$, and any node v is connected to its parent by an edge $e_v$, v=1, 2, 3, 4, 5 or 6 in this embodiment. The wirelength of $e_v$ is denoted as $|e_v|$. The skew of T is the difference between the longest signal delay from the source to a sink, i.e., $S_1, S_2, S_3$ or $S_4$ in this embodiment, and the shortest signal delay from the source to a sink. If the skew of T is zero, T is called a zero skew tree.

For a gated and buffered clock network, there are some masking gates and buffers immediately before or after some internal nodes of the clock tree. Also, there is a gating-signal control logic circuit (GCL) to generate control signals to turn on or off the masking gates. Assuming that the gating signal control logic is located at the center of the chip and star routing is applied to the controller tree CtrT. An edge $EN_i$ in CtrT transmits the control signal to the gate on edge $e_i$ of the clock tree, e.g., $e_4$ and $e_5$ in FIG. 1. Let $P(EN_i)$ denotes the signal probability of $EN_i$ (i.e., probability that $EN_i$ is one) and $Ptr(EN_i)$ denotes the transition probability of $EN_i$ (i.e., probability that $EN_i$ changes its logic value). The wirelength of $EN_i$ is denoted as $|EN_i|$.

The power consumption of a clock network is directly proportional to the switched capacitance per clock cycle. The average switched capacitance of a gated and buffered clock network (T, CtrT) per clock cycle depends on the locations of the masking gates and buffers as well as the signal probability and transition probability of each gating signal. The objective is to find a gated and buffered clock network (T, CtrT) for a given topology G so that the average switched capacitance per clock cycle is minimized subject to zero-skew constraint.

In this embodiment, $c_0$, $r_0$, $C_{buf}$, and $R_{buf}$ are the unit wire capacitance, the unit wire resistance, the buffer input capacitance, and the buffer driver resistance, respectively. A delay element is employed to indicate the intrinsic delay $T_{buf}$ of the buffer. An AND gate is modeled in the same way. $C_{and}$, $R_{and}$, and $T_{and}$ are the input capacitance, the driver resistance, and the intrinsic delay of an AND gate, respectively. Alternatively, the masking gate can be an OR gate, based on a latch and an AND gate, or based on a latch and an OR gate.

The present invention uses the deferred-merge embedding (DME) technique which will be applied in our work to ensure zero clock skew. Given the clock sink locations and a connection topology G, a merging segment ms(v) is defined as a set of possible placement locations of node v in G. A merging segment can be a point or a segment. Every position on a merging segment should keep exact zero skew for all sinks in the subtree rooted at v. The merging segment may be computed for each internal node in a bottom-up manner. For instance, if nodes l and r are the children of node v, and $TS_l$ and $TS_r$ are zero-skew subtrees rooted at l and r, lengths $|e_l|$ and $|e_r|$ may be determined that will keep zero skew between $TS_l$ and $TS_r$ such that $|e_l|+|e_r|$ is the minimum possible. The merging segment ms(v) can be obtained given the merging segments ms(l) and ms(r) for l and r, and the values of $|e_l|$ and $|e_r|$.

Figure 2:
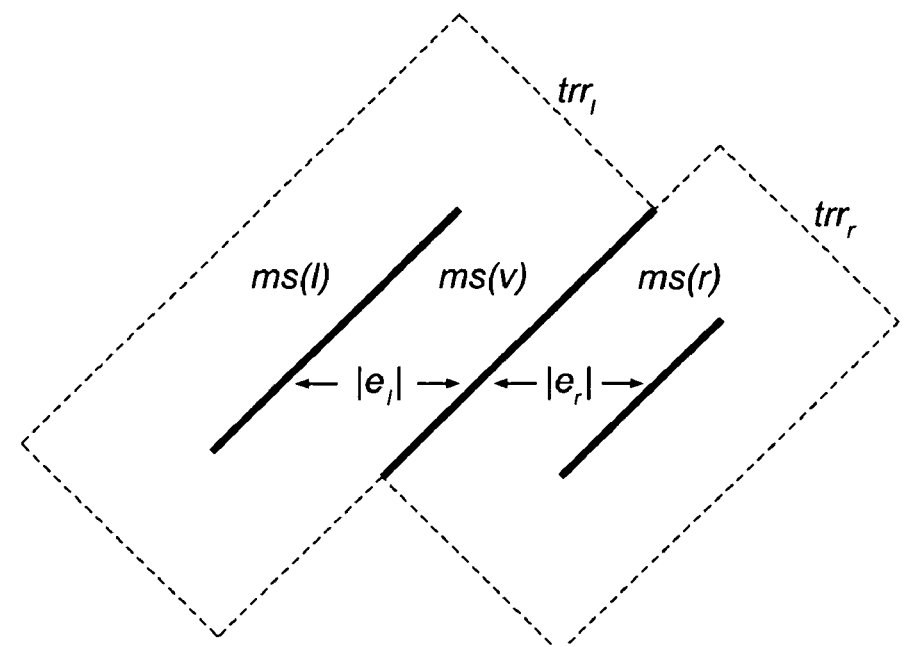
FIG. 2 illustrates the construction of a merging segment in accordance with an embodiment of the present invention.

As shown in FIG. 2, the collection of points within a fixed distance r of a merging segment is called a tilted rectangular region (trr), and r is called the radius of the tilted rectangular region. The merging segment at the center of the trr is called its core. If v is a sink $s_i$, then ms(v)={$s_i$}. If v is an internal node whose children are l and r, then ms(v)=$trr_l \cap trr_r$, i.e., ms(v) is obtained by intersecting the tilted rectangular region $trr_l$ with core ms(l) and radius $|e_l|$, and the tilted rectangular region $trr_r$ with core ms(r) and radius $|e_r|$.

Figure 3:
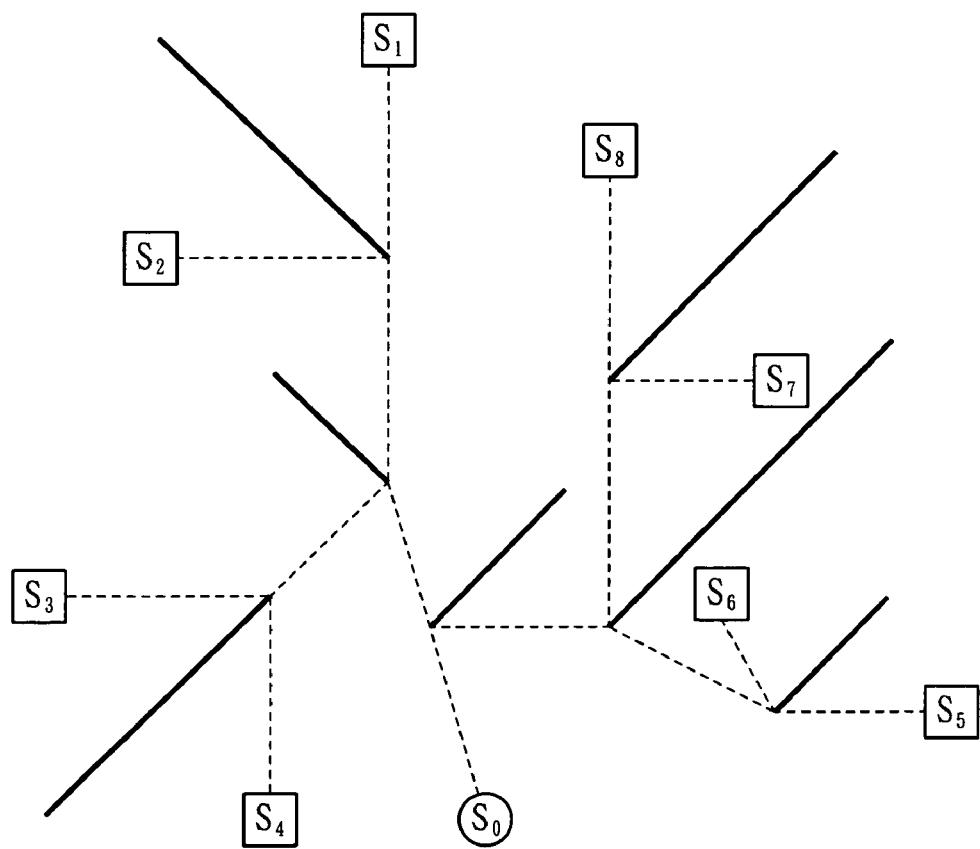
FIG. 3 illustrates a diagram of merging segments in accordance with an embodiment of the present invention.

After forming the merging segments for all internal nodes, the exact position of the internal nodes in G is found out as follows. A point on the root merging segment nearest to the clock source is selected to place the root node, and then the positions of its two children l and r are found recursively according to the lengths $|e_l|$ and $|e_r|$ computed in the bottom-up phase that will balance the skew until an exact position of every internal node is determined. The merging segments of a clock tree and the final locations of the internal nodes are shown in FIG. 3. The solid lines are merging segments and the dotted lines indicate clock edges between the final internal nodes.

This invention presents an algorithm for gated clock network construction with simultaneous gating logic and buffer insertion. First, the signal probabilities and transition probabilities are computed. Then a recursive approach computes the effective switched capacitance of a gated and buffered clock network.

Assuming that each clock sink is a module of a design in the following discussion. For each module in the design, there is an activity pattern associated with it. An activity pattern is a binary stream composed of '0's and '1's, where a '0' means that the associated module is idle at that clock period while a '1' corresponds to an active period of that module. The activity patterns can be obtained from the behavioral level simulation of a design.

A module should be supplied with the clock signal when it is active, but it is not necessary for the module to receive the clock signal when it is idle. In other words, the clock signal should be allowed being transmitted to a module whenever it is active. On the other hand, the clock signal can be gated to a module when it is idle to save the power consumption of the clock tree. Therefore the masking gate of a node must be enabled whenever the activity pattern of this node is '1', and it can be disabled otherwise. For a parent node, the masking gate must be enabled whenever its left or right child is active. Hence, the activity pattern of an internal node is calculated by performing the bitwise OR operation on the activity patterns of its two children. Let $AP_v$ denotes the activity pattern of node v. If v is an internal node with two children l and r, $AP_v = AP_l \vee AP_r$, where ∨denotes the bitwise OR operator.

Figure 4:
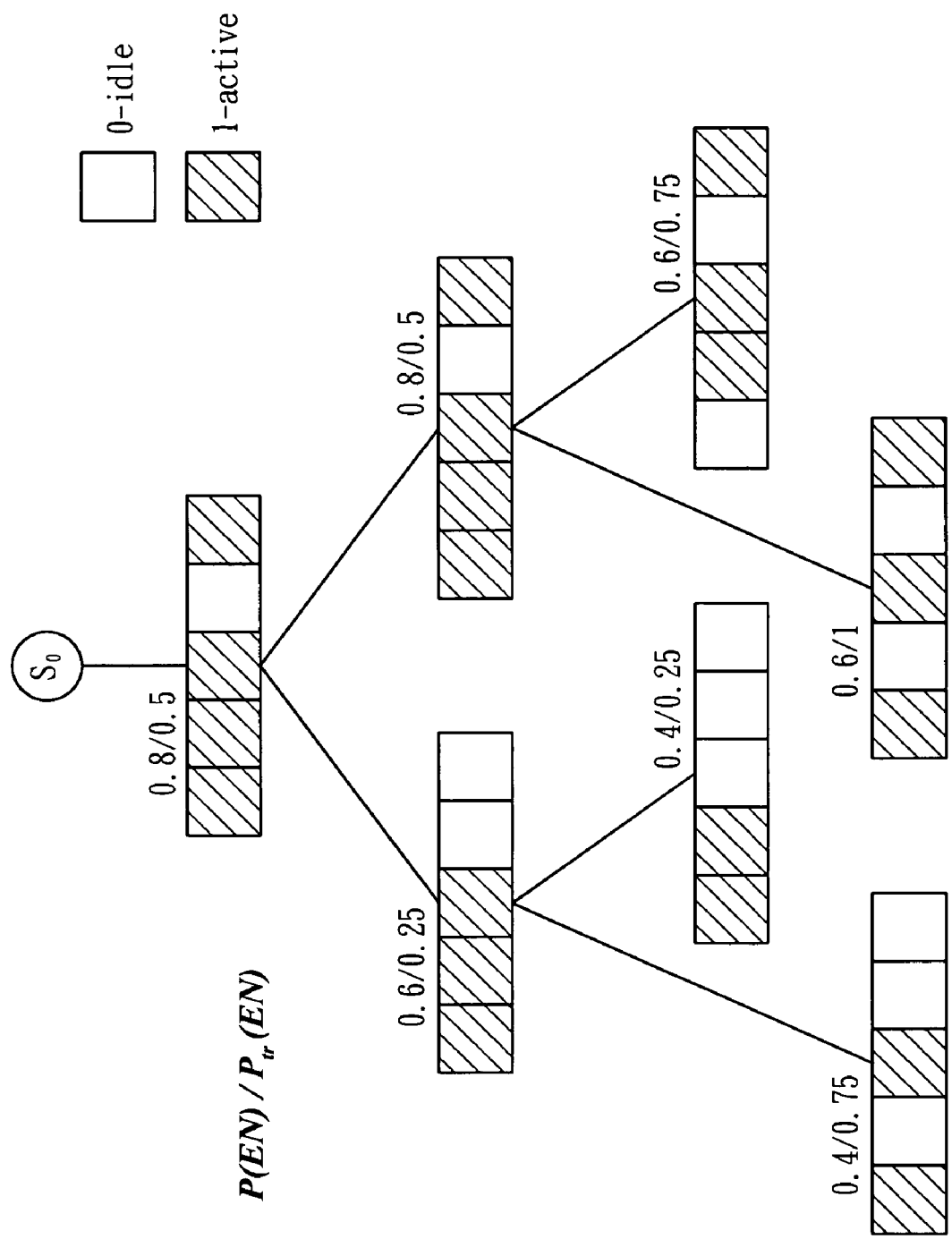
FIG. 4 illustrates an activity pattern in accordance with an embodiment of the present invention.

Recall that, the edge $EN_v$ of the controller tree connects the gating-signal control logic circuit and the masking gate on the clock tree edge $e_v$. According to the activity pattern, the signal probability of $EN_v$ is the ratio of the number of '1's to the entire length of the activity pattern, and the transition probability of $EN_v$ is the ratio of the number of transitions to the entire length of the activity minus one. $EN_v$ has a transition if for any two consecutive bits in $AP_v$ the pattern of these two bits is "01" or "10", i.e., $EN_v$ changes its value in two consecutive periods. The signal probability and the transition probability of $EN_v$ are formulated as follows, $$P(EN_v) = \frac{NumAct(AP_v)}{Len(AP_v)}, P_{tr}(EN_v) = \frac{NumTrans(AP_v)}{Len(AP_v) - 1} \quad (5)$$

where $NumAct(AP_v)$ is the number of '1's in $AP_v$, Len $(AP_v)$ is the stream length of $AP_v$, and $NumTrans(AP_v)$ is the number of transitions in $AP_v$, respectively. See FIG. 4 for an example.

The power consumption of a clock network is directly proportional to the switched capacitance per clock cycle. For a buffered clock tree without clock gating, the switched capacitance is simply the sum of all buffer, wire, and sink capacitances of the clock tree. However, it is much more difficult to compute the effective switched capacitance of a gated and buffered clock network (T, CtrT) which consists of both a clock tree T and a controller tree CtrT. Firstly, unlike the case without clock gating, the average switched capacitance per clock cycle of clock tree T will depend on the locations of the masking gates and buffers as well as the signal probability of each gating signal. Secondly, the average switched capacitance per clock cycle of the controller tree CtrT has to be taken in consideration also. In this invention, a recursive method is proposed to compute the effective switched capacitance of a general gated and buffered clock network accounting for both the clock tree's and the controller tree's switched capacitance. The recursive method is desired because it can fit nicely into the bottom up phase of DME.

In the discussion below, simply referring to the effective switched capacitance as the switched capacitance. For exposition, temporarily assuming that masking gates or buffers are inserted at the top of clock tree edges (this assumption will be relaxed at the end of this subsection). Consider the switched capacitance associated with a subtree. Let $TS_v$ be a subtree of T rooted at node v. The total capacitance below node v but above any other masking logic is called the unmasked switched capacitance of $TS_v$ (since this portion is not masked from the point of view of node v), and call the rest of the switched capacitance associated with the subtree is called the masked switched capacitance of $TS_v$. Note that in the above definition, assuming that the switched capacitance of the corresponding subtree of the controller tree for controlling $TS_v$ is included in the masked switched capacitance of $TS_v$. Let $SC_v$, $USC_v$, and $MSC_v$ denote the switched capacitance, the unmasked switched capacitance, and the masked switched capacitance of $TS_v$, respectively. Then, $$SC_v = USC_v + MSC_v \quad (EQ 1)$$

The unmasked switched capacitance of a subtree $TS_v$ can be computed recursively as follows. Let $TS_v^{lb} = \{e_l\} \cup TS_l$ and $TS_v^{rb} = \{e_r\} \cup TS_r$ where nodes l and r are the left and the right child nodes of node v, respectively. Let $USC_v$, $USC_v^{lb}$, and $USC_v^{rb}$ denote the unmasked switched capacitance of $TS_v$, $TS_v^{lb}$, and $TS_v^{rb}$, respectively.

$$USC_v = \begin{cases} c_v & \text{if } v \text{ is a sink} \\ USC_v^{lb} + USC_v^{rb} & \text{if } v \text{ is an internal node,} \end{cases} \quad (EQ 2)$$

where $USC_v^{lb} = \begin{cases} C_{and} & \text{if } e_l \text{ is top-gated} \\ C_{buf} + c_0|e_l| + USC_l & \text{if } e_l \text{ is top-buffered} \\ c_0|e_l| + USC_l & \text{otherwise,} \end{cases}$ and $USC_v^{rb}$ is analogous to $USC_v^{lb}$.

Next, the masked switched capacitance of a subtree $TS_v$ is computed. Consider the left half of $TS_v$, i.e., $TS_v^{lb}$, there are two cases. In case 1, there is no masking gate on edge $e_l$, then the capacitance of $e_l$ is not included in the masked switched capacitance of $TS_v^{lb}$. Hence, the masked switched capacitance of $TS_v^{lb}$ should be equal to the masked switched capacitance below node l, i.e., $MSC_l$. In case 2, there is a masking gate $g_l$ at the top of edge $e_l$. Then the capacitance below $g_l$ but above the next level of masking logic is masked by gate $g_l$. Thus, the amount of switching for the capacitance below this gate but above the next level of masking logic should be discounted by the factor $P(EN_l)$. By definition, the capacitance below gate $g_l$ but above the next level of masking logic is $c_0|e_l| + USC_l$, so this quantity needs to be multiplied by $P(EN_l)$. In addition, the switched capacitance of the controller tree branch controlling gate $g_l$ is included. Since gate $g_l$ is inserted immediately below node v, the switched capacitance of the controller tree branch controlling gate $g_l$ is $(c_0 \cdot dist(GCL,v) + C_{and}) P_{tr}(EN_l)/2$ where $dist(GCL,v)$ is the distance between the gating-signal control logic circuit and node v. Finally, the masked switched capacitance below the next level of masking logic which is equal to $MSC_l$ has to be added. Let $MSC_v$, $MSC_v^{lb}$, and $MSC_v^{rb}$ denote the masked switched capacitance associated with $TS_v$, $TS_v^{lb}$, and $TS_v^{rb}$, respectively. Based on the above case analysis, $$MSC_v = \begin{cases} 0 & \text{if } v \text{ is a sink} \\ MSC_v^{lb} + MSC_v^{rb} & \text{if } v \text{ is an internal node,} \end{cases} \quad (EQ 3)$$

where $$MSC_v^{lb} = \begin{cases} (c_0|e_l| + USC_l) P(EN_l) + \\ \frac{1}{2}(c_0 \cdot dist(GCL, v) + C_{and}) P_{tr}(EN_l) + MSC_l & \text{if } e_l \text{ is top-gated} \\ MSC_l & \text{otherwise,} \end{cases}$$

and $MSC_v^{rb}$ is analogous to $MSC_v^{lb}$.

The switched capacitance $SC_v$ of subtree $TS_v$ is the sum of its left branch switched capacitance $SC_v^{lb}$ and its right branch switched capacitance $SC_v^{rb}$, hence $$SC_v = \begin{cases} c_v & \text{if } v \text{ is a sink} \\ SC_v^{lb} + SC_v^{rb} & \text{if } v \text{ is an internal node,} \end{cases} \quad (EQ 4)$$

where $SC_v^{lb} = USC_v^{lb} + MSC_v^{lb}$ and $SC_v^{rb} = USC_v^{rb} + MSC_v^{rb}$.

Note that it is possible to compute the switched capacitance SC without computing the MSC explicitly. Substituting (EQ 2) and (EQ 3) into $SC_v^{lb} = USC_v^{lb} + MSC_v^{lb}$, $$SC_v^{lb} = \begin{cases} C_{and} + (c_0|e_l| + USC_l)P(EN_l) + \\ \quad \frac{1}{2}(c_0 \cdot dist(GCL, v) + C_{and})P_{tr}(EN_l) + MSC_l & \text{if } e_l \text{ is top-gated} \\ C_{buf} + c_0|e_l| + USC_l + MSC_l & \text{if } e_l \text{ is top-buffed} \\ c_0|e_l| + USC_l + MSC_l & \text{otherwise.} \end{cases} \quad \text{(EQ 5)}$$

$P(EN_l)$ is defined to be 1 and $P_{tr}(EN_l)$ to be 0 when $e_l$ is not gated. From (EQ 1), $MSC_l = SC_l - USC_l$. So, (EQ 4) and (EQ 5) can be simplified as $$SC_v = \begin{cases} c_v & \text{if } v \text{ is a sink} \\ SC_v^{lb} + SC_v^{rb} & \text{if } v \text{ is an internal node,} \end{cases} \quad \text{(EQ 6)}$$

where $$SC_v^{lb} = C_l + (c_0|e_l| + USC_l)P(EN_l) + \frac{1}{2}(c_0 \cdot dist(GCL, v) + C_{and})P_{tr}(EN_l) + (SC_l - USC_l)$$

and $$C_l = \begin{cases} C_{and} & \text{if } e_l \text{ is top-gated;} \\ C_{buf} & \text{if } e_l \text{ is top-buffered;} \\ 0 & \text{otherwise.} \end{cases}$$

$SC_v^{rb}$ is analogous to $SC_v^{lb}$.

Figure 5:
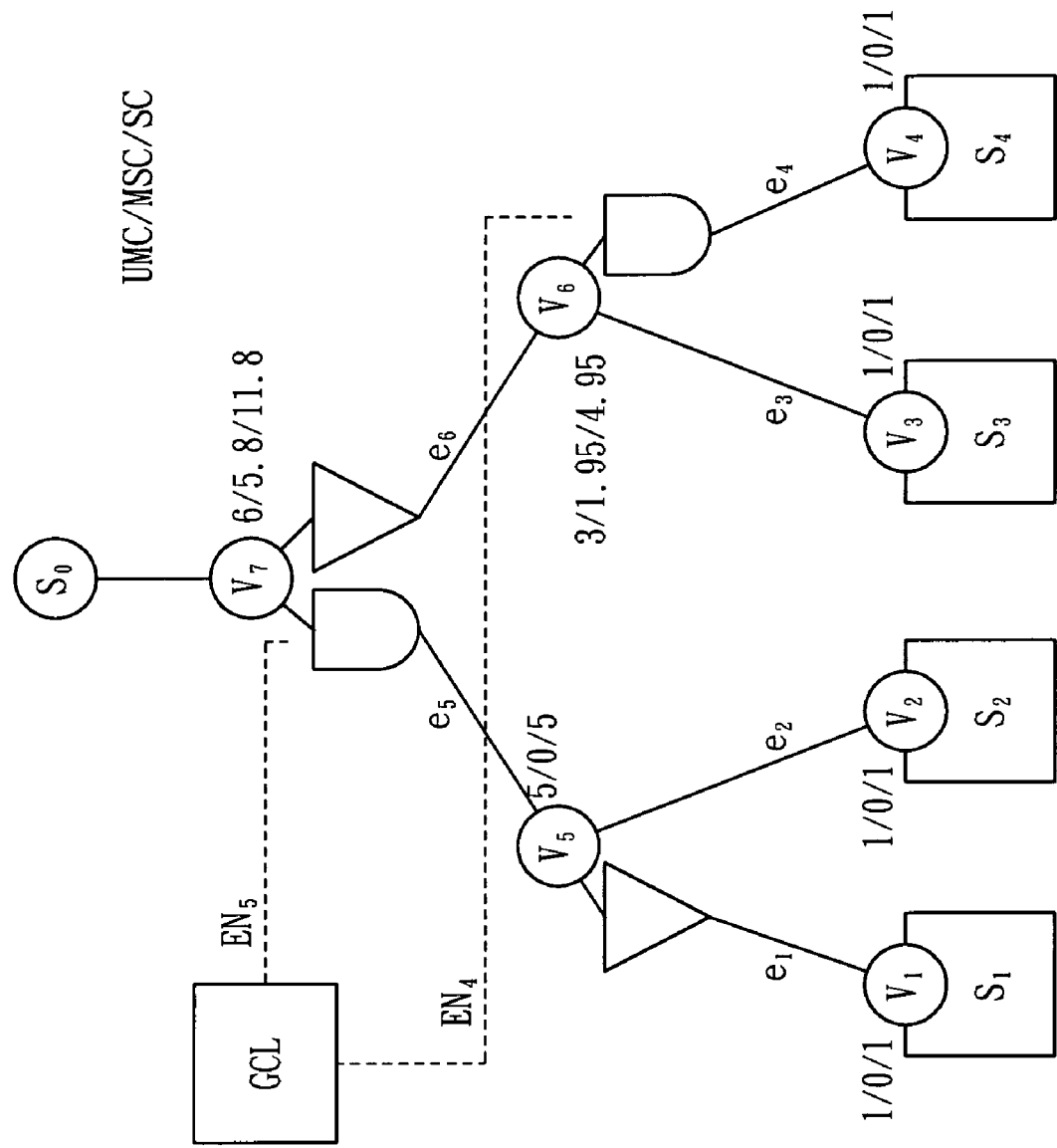
FIG. 5 illustrates switched capacitance in accordance with an embodiment of the present invention.

An example of the computation of unmasked switched capacitance, masked switched capacitance, and switched capacitance is given in FIG. 5. The activity pattern associated with each node is as in FIG. 4, so $P(EN_4)=0.6$, $P_{tr}(EN_4)=0.75$, $P(EN_5)=0.6$, and $P_{tr}(EN_5)=0.25$. The load capacitance of each sink, the input capacitance of a buffer, the input capacitance of an AND gate, the capacitance of each clock tree edge, and the capacitance of each controller tree edge are all assumed to be 1 unit.

In the analysis above, assuming that masking gates or buffers are inserted at the top of the clock tree edges. However, it can be easily extended to the more general situation where masking gates or buffers can be freely inserted at the top or at the bottom of the clock tree edges. It is not difficult to see that if masking gate/buffer insertion at the bottom of tree edges is allowed, then the recurrence equations (EQ 2) and (EQ 6) for the unmasked switched capacitance $USC_v$ and the switched capacitance $SC_v$ of subtree $TS_v$ should be replaced by (EQ 7) and (EQ 8), respectively.

$$USC_v = \begin{cases} c_v & \text{if } v \text{ is a sink} \\ USC_v^{lb} + USC_v^{rb} & \text{if } v \text{ is an internal node,} \end{cases} \quad \text{(EQ 7)}$$

where $$USC_v^{lb} = \begin{cases} C_{and} & \text{if } e_l \text{ is top-gated} \\ c_0|e_l| + C_{and} & \text{if } e_l \text{ is bottom-gated} \\ C_{buf} + c_0|e_l| + USC_l & \text{if } e_l \text{ is top-buffered or bottom-buffered} \\ c_0|e_l| + USC_l & \text{otherwise,} \end{cases}$$

and $USC_v^{rb}$ is analogous to $USC_v^{lb}$.

$$SC_v = \begin{cases} c_v & \text{if } v \text{ is a sink} \\ SC_v^{lb} + SC_v^{rb} & \text{if } v \text{ is an internal node,} \end{cases} \quad \text{(EQ 8)}$$

where $$SC_v^{lb} = \begin{cases} C_{and} + (c_0|e_l| + USC_l)P(EN_l) + \\ \quad \frac{1}{2}(c_0 \cdot dist(GCL, v) + C_{and})P_{tr}(EN_l) + (SC_l - USC_l) & \text{if } e_l \text{ is top-gated} \\ C_{and} + (c_0|e_l| + USC_l)P(EN_l) + \\ \quad \frac{1}{2}(c_0 \cdot dist(GCL, l) + C_{and})P_{tr}(EN_l) + (SC_l - USC_l) & \text{if } e_l \text{ is bottom-gated} \\ C_{buf} + c_0|e_l| + SC_l & \text{if } e_l \text{ is top-buffered or bottom-buffered} \\ c_0|e_l| + SC_l & \text{otherwise,} \end{cases}$$

and $SC_v^{rb}$ is analogous to $SC_v^{lb}$.

The present invention extends the DME technique to deal with gating logic insertion and buffer insertion simultaneously while guaranteeing that the final clock tree is zero skew. In the bottom-up merging phase of DME, the root of a subtree is a merging segment representing the loci of possible zero-skew embedding point of the subtree root. Considering the possibility of masking gate and/or buffer insertion, the possible zero-skew embedding point of the new subtree root is no longer a single merging segment but a set of merging segments. Hence, the concept of merging segment is extended to that of merging segment set (MSS), which is the set of merging segments associated with a node. The merging segment set of a node v is denoted as MSS(v)={$ms_{v,1}$, $ms_{v,2}$, . . . , $ms_{v,k}$}, which contains k merging segments of v.

The bottom-up merging and the top-down embedding phase of our approach are described below. When merging the subtree rooted at node l and the subtree rooted at node r to form a new subtree rooted at their parent node v, one merging segment $ms_{l,i}$ from MSS(l) and one merging segment $ms_{r,j}$ from MSS(r) are used to perform the zero-skew merge based on different gate/buffer insertion scenarios on clock tree edges $e_l$ and $e_r$. For each merging scenario, the lengths of $e_l$ and $e_r$ that achieve a zero-skew mergence of two subtrees can be obtained. But for the merging scenarios involving gating, the exact length of the control edge(s) is not known because the information about the exact embedding location of v/l/r during the bottom-up phase is not obtained yet. Therefore, the length of $EN_l$ or $EN_r$ is estimated to be dist(GCL, center(ms (v))) which denotes the distance between the gating-signal control logic circuit and the center point of the merging segment of v if $e_l(e_r)$ is top-gated. And the length of $EN_l$ and $EN_r$ is estimated to be dist(GCL, center(ms(l))) or dist(GCL, center(ms(r)) respectively if $e_l$ ($e_r$) is bottom-gated. Then the resultant switched capacitance corresponding to each merging scenario can be computed by (EQ 8). This is done for every possible combination of $ms_{l,i}$ from MSS(l) and $ms_{r,j}$ from MSS(r). All the merging segments generated from the above 20 procedure form the merging segment set of the parent node v. FIG. 6 and FIG. 7 show an embodiment of the bottom-up merging phase and the top-down embedding phase of our algorithm, respectively.

The present invention presents a recursive approach to compute the effective switched capacitance of a general gated and buffered clock network accounting for both the clock tree's and the controller tree's switched capacitance. According to an experiment, the power consumptions of the gated clock networks constructed by our algorithm can be reduced by 20 to 36%.

The above-described embodiments of the present invention are intended to be illustrative only. Numerous alternative embodiments may be devised by those skilled in the art without departing from the scope of the following claims.

What is claimed is:

1. A method for reducing power consumption for an integrated circuit on a substrate, comprising the steps of:
   providing a clock tree and a gate-signal control logic circuit on a substrate, wherein the clock tree comprises a clock source, a plurality of clock sinks, and a plurality of internal nodes;
   recursively determining a merging segment set containing merging segments for each node and computing switched capacitance of a subtree rooted at each node in a bottom up manner, wherein the merging segments have the same signal delay for the clock sinks in a subtree rooted at each node; and
   recursively determining a location for each node selected from the merging segment set in a top down manner on a basis that the switched capacitance of a subtree rooted at each node is minimum;
   wherein the switched capacitance of a subtree rooted at a node is a sum of switched capacitance of a first portion of the subtree having a first child node of the node and switched capacitance of a second portion of the substree having a second child node of the node,
   wherein if a masking gate is placed on an edge connecting the node and the first child node, the switched capacitance of the first portion of the subtree having a first child node of the node is a function related to capacitance of the gate, capacitance of the edge, and capacitance between the node and the gating-signal control logic circuit, a signal probability of the gating-signal control logic circuit to the first child node, and a transition probability of the gating-signal control logic circuit to the first child node.

2. The method of claim 1, wherein the step of recursively determining a location for each node further comprises inserting a masking gate and/or a buffer on an edge connecting each node and the parent node thereof.

3. The method of claim 2, wherein the masking gate is AND gate.

4. The method of claim 2, wherein the masking gate is OR gate.

5. The method of claim 2, wherein the masking gate is comprised of a latch and an AND gate.

6. The method of claim 2, wherein the masking gate is comprised of a latch and an OR gate.

7. The method of claim 1, wherein the signal probability of the gating-signal control logic circuit to the first child node is a ratio of the number of logic 1 of an activity pattern of the node to the length of the activity pattern of the node, and the transition probability of the gating-signal control logic circuit to the first child node is a ratio of the number of logic transitions for any consecutive bits in the activity pattern of the node to the length of the activity pattern of the node subtracting one.

8. The method of claim 1, wherein if a buffer is placed on an edge connecting the node and the first child node, the switched capacitance of the first portion of the subtree having a first child node of the node is a function of capacitance of the buffer, capacitance of the edge, and switched capacitance of a subtree rooted at the first child node.

9. The method of claim 1, wherein if a buffer is placed on an edge connecting the node and the first child node, the switched capacitance of the first portion of the subtree having a first child node of the node is a sum of capacitance of the buffer, capacitance of the edge, and switched capacitance of a subtree rooted at the first child node.

10. The method of claim 1, wherein if there is no masking gate or buffer insertion on an edge connecting the node and the first child node, the switched capacitance of the first portion of the subtree having a first child node of the node is a function of the capacitance of the edge and switched capacitance of a subtree rooted at the first child node.

11. The method of claim 1, wherein if there is no masking gate or buffer insertion on an edge connecting the node and the first child node, the switched capacitance of the first portion of the subtree having a first child node of the node is a sum of capacitance of the edge and switched capacitance of a subtree rooted at the first child node.

12. The method of claim 1, wherein the capacitance of the edge is proportional to the length of the edge.

* * * * *